Aug. 14, 1951     T. R. HARRISON     2,563,931

RATE RESPONSIVE THERMOCOUPLE

Filed April 2, 1946

INVENTOR.
THOMAS R. HARRISON

BY

ATTORNEY.

Patented Aug. 14, 1951

2,563,931

UNITED STATES PATENT OFFICE 2,563,931

RATE RESPONSIVE THERMOCOUPLE

Thomas R. Harrison, Wyncote, Pa., assignor, by mesne assignments, to Minneapolis-Honeywell Regulator Company, Minneapolis, Minn., a corporation of Delaware Application April 2, 1946, Serial No. 658,899

3 Claims. (Cl. 136—4)

The present invention relates to thermocouples and more particularly to a thermocouple that will give a magnified response during the time that the temperature under measurement and control is changing from one value to another.

It is an object of the invention to provide a thermocouple made of three different metals and having the characteristic of producing an electromotive force that changes as the temperature to which it is subjected changes, and which will produce when the temperature is changing an electromotive force that is greater than or less than that which is produced by the thermocouple for a given temperature under steady state. When a thermocouple having this characteristic is used with a control instrument and the temperature under control is, for example, increasing, the instrument will respond to a greater extent than it will with an ordinary thermocouple and the change in temperature will be more quickly checked. This, in effect, is a response that varies with the temperature and the rate of change of the temperature.

It is a further object of the invention to provide a control system in which a potentiometer type control instrument is used with a thermocouple similar to that described in the above paragraph. Such a control system has the practical effect of responding to a rate of change in the temperature under control and stopping the change prior to the time it can deviate far from its normal value. Actually during the time that the temperature is changing the thermocouple will supply to the instrument an electromotive force which is greater than or less than that produced for the same temperature if it is not changing. Therefore the instrument acts as if a greater change in temperature has taken place than has actually occurred, and accordingly will give a more positive corrective control action.

It is a further object of the invention to provide a thermocouple which when used with a control instrument will provide a control system that is responsive to the rate of change of the temperature under control.

Thermocouples which give a rate of change effect are known in the art. The known thermocouples, however, are all of the multiple type consisting of a plurality of similar two wire thermocouples joined together with alternate junctions heavily lagged. The thermocouple used in the present invention differs from those previously known in that a rate effect may be obtained by a simple three element thermocouple using dissimilar elements and without the use of a cumbersome construction. By varying the materials of which the thermocouple elements are made a larger or smaller rate effect my be obtained. This is a decided advantage since the thermocouple may be tailor-made for various applications to give just the right response.

The various features of novelty which characterize my invention are pointed out with particularity in the claims annexed to and forming a part of this specification. For a better understanding of the invention, however, its advantages and specific objects attained by its use, reference should be had to the accompanying drawings and descriptive matter in which I have illustrated and described preferred embodiments of the invention.

Figure 1:
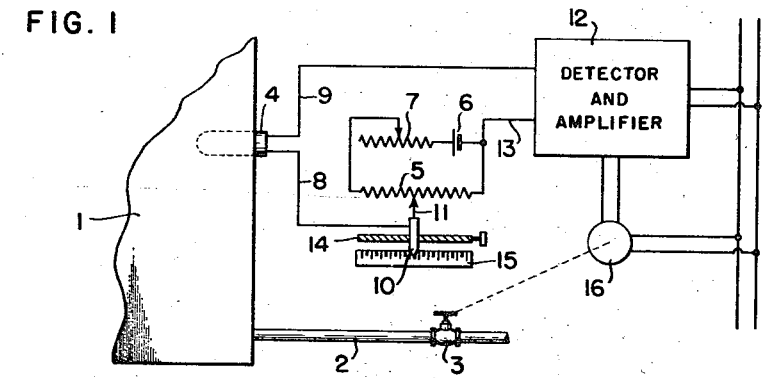
Figure 1 is a view of the control system.

Referring first to Figure 1 there is shown a furnace or other heater 1 to which a temperature changing fluid is supplied by a pipe 2 that has an automatically adjusted valve 3 in it. The temperature of the furnace is measured and controlled by a thermocouple designated generally at 4 and used in connection with a potentiometer type network. This network includes a slide wire 5 across which a suitable potential drop is impressed by a battery 6. Located in the circuit is an adjustable resistance 7 by means of which this potential drop may be adjusted to some standard value. Lead wires 8 and 9 from the thermocouple extend, respectively, to a contact 11 which is in engagement with the slide wire and to a detector and amplifier unit 12. This amplifier unit is also connected to the slide wire by a wire 13. The detector and amplifier unit 12 may take the form of that shown in the application of Walter P. Wills, Serial No. 421,173, filed December 1, 1941, which issued as Patent No. 2,423,540 on July 8, 1947. Contact 11 is mounted on a support 10 that can be adjustably positioned to any desired point along the slide wire by rotating a helically threaded shaft 14 upon which the support is mounted. The support 10 cooperates with a scale 15 which may be calibrated in temperature. Contact 11 is adjusted along the scale and slidewire to a position corresponding to the value at which it is desired to maintain the temperature of the furnace.

In operation, when the furnace temperature is correct the thermocouple voltage is just balanced by the potential drop across the portion of the slidewire included in the thermocouple circuit, and no current flows in the circuit. As the furnace temperature changes a current will flow in the thermocouple circuit which is detected and amplified by unit 12 to produce energization of a motor 16 in one direction or the other, depending upon the direction of temperature change. Motor 16 adjusts valve 3 to adjust the supply of fluid in pipe 2 in a direction to bring the furnace temperature back to normal. If the motor is so large that it cannot be energized directly by unit 12 some suitable relay unit may be used between the two.

Figure 2:
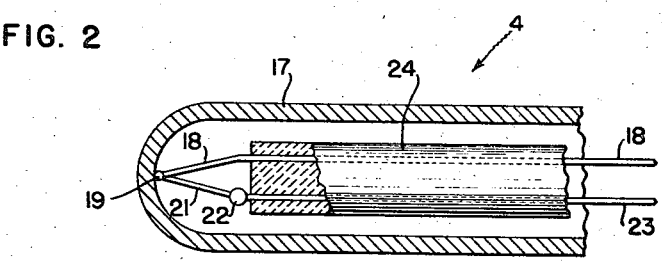
Figure 2 is an enlarged view of one form that the thermocouple may take.

The thermocouple unit may be of the type shown in Figure 2 in which figure there is shown a protecting tube 17 to protect the thermocouple from the atmosphere of the furnace. This protecting tube, however, may be dispensed with if the atmosphere of the furnace will not adversely affect the materials of which the thermocouple is made. As shown in this figure, the thermocouple consists of a first wire 18 that is joined at a relatively small hot junction 19 with a second thermocouple wire 21. This second wire is connected by a relatively large hot junction 22 with a third thermocouple wire 23. The two wires 18 and 23 are supported back of the two junctions by means of an insulating member 24 that is preferably made of some ceramic material. If the protecting tube 17 is used hot junction 19 preferably touches the interior of the tube to increase the heat transfer between the two.

Figure 3:
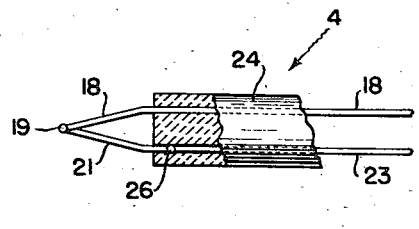
Figure 3 is an enlarged view of another form of the thermocouple.

In Figure 3 there is shown another form of the thermocouple in which wire 18 is joined by a small hot junction with wire 21 and in which wire 21 is joined by a second small hot junction 26 with wire 23. In this case, however, the second junction 26 is located within the end of insulating member 24. A protecting tube of the type shown at 17 in Figure 2 may, of course, be used with the thermocouple of Figure 3 if desired or necessary.

In each form of the thermocouple the wires or elements of which it is made are so selected that the electromotive force produced by wires 18 and 21 is considerably larger than the electromotive force produced by wires 21 and 23. The manner in which the material for these wires may be selected and examples of them will be given in detail below.

The E. M. F. produced by a thermocouple depends upon the algebraic sum of the E. M. F.'s produced by each of the junctions of which it consists. For all practical purposes it may be stated that the E. M. F. produced by a thermocouple is equal to that for a thermocouple made of the two wires extending to the cold junction, in this case wires 18 and 23, if all of the hot junctions are at the same temperature. The total E. M. F. produced for a given temperature will change from this value, however, when the temperature of one hot junction varies from that of another, and in an amount proportional to this variation.

In the example shown in Figure 2 both of the hot junctions 19 and 22 are exposed in the same manner to the temperature to be measured. Since the junction 19 has much less mass than the junction 22, the former will respond more quickly to changes in temperature than will the latter. Therefore the E. M. F. produced at junction 19 by wires 18 and 21 will change more rapidly than that produced at junction 22 by wires 21 and 23. Since the E. M. F. prdouced by junction 19 is greater than that produced by junction 22, the total output of the thermocouple during the time that the temperature is increasing, for example, will be higher than it would be for the same temperature if the temperature was not changing and junctions 19 and 22 are equalized. This means that at the control instrument the temperature during a change will appear momentarily to be higher than it actually is. Consequently the control valve will be given a relatively large corrective adjustment to off-set this apparent high temperature. As the temperatures of the two junctions 19 and 22 again equalize the valve will be reversely adjusted to a position to maintain the temperature of the furnace at the proper value.

The same procedure will be followed if the temperature of the furnace is decreasing instead of increasing. In this case, however, the total E. M. F. produced will be less than it would be for the same temperature if the temperature were not changing. This is true since junction 19 because of its smaller mass will cool off more quickly than will junction 22. In this embodiment of the invention in which both of the hot junctions are exposed in the same manner to the temperature being measured, it is essential that junction 22 have more mass or heat storing capacity than junction 19. The rate effect of the thermocouple may be changed somewhat by varying the mass of junction 22. The larger this junction, the longer it will require for its temperature to equalize with that of junction 19. This means that the rate effect will last longer.

The thermocouple of Figure 3 operates in a manner identical to that of Figure 2. In this case, however, the two hot junctions 19 and 26 are not exposed in the same manner to the temperature being measured. Junction 26 is moved back in ceramic tube 24 in a protected position. Since junction 26 is not directly exposed a longer time is required for it to assume the temperature of junction 19, upon the occurrence of a temperature change, than otherwise would be the case. Because of this delay in the equalization of the temperatures of the two junctions a rate effect is obtained. This effect may be varied somewhat by varying the distance that junction 26 is placed from the end of tube 24. In some cases junction 26 may be placed outside of but adjacent the end of tube 24 and affected by conduction thereto.

As has been stated above, the E. M. F. produced by wires 18 and 21 should be greater than that produced by wires 21 and 23. Bureau of Standards Technologic Paper No. 170, Pyrometric Practice, 1921, has on page 307 a chart showing the E. M. F.'s of various materials versus platinum. Reference to this chart shows that Chromel is more positive than Alumel, and that the latter is more positive than constantan. Therefore a thermocouple satisfying the requirements of the present invention may be made with wire 18 of constantan, wire 21 of Chromel and wire 23 of Alumel. The E. M. F. produced by junction 19 for a given temperature if wires 18 and 21 are of constantan and Chromel, respectively, will be greater than that produced by junction 22 or 26 if wires 21 and 23 are of Chromel and Alumel, respectively.

As mentioned above, the Bureau of Standards Technologic Paper #170 gives the output characteristics for the materials Chromel, Alumel and constantan. These materials are of standard composition, and the variations in these materials which result during manufacture are so small as to produce negligible differences in the characteristics of the materials. Consequently, the values of output voltage of Chromel, Alumel and constantan as given by the Bureau of Standards are fixed and remain substantially constant. For purposes of illustration, the following are the compositions of the above thermocouple materials as employed in the present invention:

Chromel—
    10% chrominum
    90% nickel
Alumel—
    2% aluminum
    94% nickel
    2½% manganese
    ½% iron
Constantan—
    55% copper
    45% nickel Although the compositions just given may vary slightly due to manufacturing variations as mentioned above, the commercial purity of the thermocouple materials is such that any effects produced by such variations are negligible for the purposes of the present invention.

The following table shows the millivolts produced by the thermocouple materials mentioned above and will serve to illustrate the rate effect produced by the thermocouple of the example.

|  | 500° F. | 600° F. | 700° F. | 800° F. |
|---|---|---|---|---|
|  | Mv. | Mv. | Mv. | Mv. |
| Chromel-Constantan | 16.40 | 20.80 | 25.20 | 29.70 |
| Alumel-Chromel | 10.56 | 12.85 | 15.18 | 17.52 |
| Millivolts for Total Couple | 5.84 | 7.95 | 10.02 | 12.18 |

From the above table it will be seen that at 500° F. the thermocouple will produce 5.8 millivolts while at 700° F. it will produce 10.0 millivolts if junctions 19 and 22 or 26 are at the same temperature. If the thermocouple is subjected to a sudden increase in temperature, for example, junction 19 will more rapidly increase its output than will junction 22 or 26. Therefore the E. M. F. produced by the couple during and immediately after the temperature change will be larger than will be produced when junction 22 or 26 has heated up. The effect on the control instrument is that an apparent temperature greater than the actual temperature is detected. This in turn causes the instrument to give an initially large adjustment to the valve and then a small reverse adjustment until the final valve position is reached. The adjustment is proportional to the combined change in temperature and the rate at which the temperature is changing and is applied in such a manner that the temperature is returned quickly toward its normal value while the tendency to over-shoot is nullified.

The above example and further examples of combinations of materials that can satisfy the requirements of the present invention are listed in the table below.

| Wire 18 | Wire 21 | Wire 23 |
|---|---|---|
| —Constantan | +Chromel | —Alumel |
| +Chromel | —Constantan | +Alumel |
| —Pt | +Pt, 20% Rh | —Pt, 5% Rh |
| +Chromel | —Alumel | +Pt |
| —Constantan | +Cu | —Alumel |

The minus and plus signs in front of the various materials indicate the direction of current flow for a thermocouple of those two elements.

From the above description it will be seen that by combining various thermocouple materials into a thermocouple of three elements when a selection of materials is made in the manner set forth, a thermocouple having a rate responsive characteristic may readily be made. The use of a thermocouple of this type in conjunction with an ordinary proportioning or floating type of controller will produce an extremely simple control system having a rate responsive characteristic.

While, in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. A rate responsive thermocouple adapted to be exposed to a source of heat, comprising a first element formed of a first material, a second element formed of a second material and joined at one end to one end of said first element at a first thermoelectric junction, said first and second materials having different positions in the thermoelectromotive series and producing an E. M. F. at said first junction when the latter is heated, a third element formed of a third material and joined at one end to the other end of said second element at a second thermoelectric junction having a mass substantially equal to that of said first junction, said third material having a position in the thermoelectromotive series different from those of said first and second materials and producing an E. M. F. at said second junction which is smaller than and opposite to the first mentioned E. M. F. when both of said junctions are heated to the same temperature, said first and third elements being adapted to be exposed to a source of heat along a sufficient portion of their lengths in the vicinity of said junctions so as to be operative when so exposed to cause any heat which is conducted away from the source by said first and third elements to be supplied from the source to said first and third elements at portions thereof remote from said junctions and hence to cause no heat to be supplied to or removed from said junctions when the latter have been exposed to the source of heat for a sufficient length of time to establish an equilibrium condition, whereby both of said junctions are adapted to attain the temperature of a source of heat to which the thermocouple may be exposed, and an insulating structure operatively associated with said second junction and operative to insulate thermally said second junction from the source of heat to a greater extent than said first junction is insulated therefrom, whereby said second junction possesses greater thermal time lag than does said first junction.

2. A thermocouple as specified in claim 1, wherein said second element is short compared to said first and third elements.

3. A thermocouple as specified in claim 1, wherein said first material is platinum, wherein said second material is an alloy comprising platinum and a percentage of rhodium, and wherein said third material is an alloy comprising platinum and a smaller percentage of rhodium than is contained in said second material.

THOMAS R. HARRISON.

REFERENCES CITED

The following references are of record in the file of this patent:

UNITED STATES PATENTS

| Number | Name | Date |
|---|---|---|
| 1,468,456 | Bristol | Sept. 18, 1923 |
| 1,561,593 | Brown | Nov. 17, 1925 |
| 2,054,120 | De Florez | Sept. 15, 1936 |
| 2,084,654 | Ray | June 22, 1937 |
| 2,156,235 | Betz et al. | Apr. 25, 1939 |
| 2,193,516 | Laing | Mar. 12, 1940 |
| 2,261,343 | De Florez et al. | Nov. 4, 1941 |
| 2,304,489 | Wetzel | Dec. 8, 1942 |
| 2,337,000 | Ray | Dec. 14, 1943 |
| 2,339,809 | Ray | Jan. 25, 1944 |
| 2,385,530 | Paille | Sept. 25, 1945 |
| 2,400,384 | Betz | May 14, 1946 |
| 2,413,128 | Wills | Dec. 24, 1946 |
| 2,430,887 | Ray | Nov. 18, 1947 |

FOREIGN PATENTS

| Number | Country | Date |
|---|---|---|
| 213,868 | Great Britain | Apr. 7, 1924 |

OTHER REFERENCES

Day et al.: Carnegie Inst. Publ. 157 (1911), page 122.

Foote et al.: Bur. Stds. T. P. #170 (1921), page 307.

Behar, M. F.: Instruments, October 1940, page 317.